United States Patent [19]

Kleven

[11] Patent Number: 5,429,001

[45] Date of Patent: * Jul. 4, 1995

[54] VORTEX MASS FLOWMETER

[75] Inventor: Lowell Kleven, Eden Prairie, Minn.

[73] Assignee: Rosemount Inc., Eden Prairie, Minn.

[*] Notice: The portion of the term of this patent subsequent to Dec. 13, 2011 has been disclaimed.

[21] Appl. No.: 258,767

[22] Filed: Jun. 13, 1994

Related U.S. Application Data

[63] Continuation-in-part of Ser. No. 954,513, Sep. 30, 1992, Pat. No. 5,372,046.

[51] Int. Cl.$^6$ .................................................... G01F 1/32
[52] U.S. Cl. .................................... 73/861.22; 327/552
[58] Field of Search .................. 73/861.22; 328/167, 328/162, 165; 307/520, 521, 543

[56] References Cited

U.S. PATENT DOCUMENTS

| | | | |
|---|---|---|---|
| 3,638,037 | 1/1972 | McMurtric | 307/520 |
| 3,719,073 | 6/1973 | Mahon et al. | 73/194 |
| 3,776,033 | 12/1973 | Herzl | 73/194 |
| 3,864,972 | 2/1975 | Burgess et al. | 73/861.22 |
| 3,992,939 | 11/1976 | November | 73/194 |
| 4,048,854 | 9/1977 | Herzl | 73/194 |
| 4,094,194 | 6/1978 | Herzl | 73/194 |
| 4,169,376 | 10/1979 | Herzl | 73/194 |
| 4,437,350 | 3/1984 | Tamura et al. | 73/861 |
| 4,448,081 | 5/1994 | Kolitsch et al. | 73/861 |
| 4,523,477 | 6/1985 | Miller | 73/861 |
| 4,561,310 | 12/1985 | Barnard et al. | 73/861 |
| 4,815,324 | 3/1989 | Tada et al. | 73/861.24 |
| 4,879,909 | 11/1989 | Lew | 73/861 |
| 4,884,441 | 12/1989 | Lew | 73/195 |
| 4,893,035 | 1/1990 | Reynolds et al. | 307/520 |
| 4,941,361 | 7/1990 | Lew | 73/861 |
| 4,972,723 | 11/1990 | Lew | 73/861 |
| 4,973,062 | 11/1990 | Lew | 73/861 |
| 5,060,522 | 10/1991 | Lew | 73/861 |
| 5,152,181 | 10/1992 | Lew | 73/861 |

FOREIGN PATENT DOCUMENTS

| | | | |
|---|---|---|---|
| 0549945A2 | 7/1993 | European Pat. Off. | G01F 1/20 |
| 3-277973 | 12/1991 | Japan | G01P 5/08 |
| 5-18798 | 1/1993 | Japan | G01F 1/32 |

OTHER PUBLICATIONS

"Isolation Amplifier Based on Sigma Delta Modulation", NASA Tech Briefs, National Aeronautics and Space Administration, Technical Support Package, vol. 18(7), Jul. 1994.

"Mass Flowmeter Detecting Fluctuations in Lift Generated by Vortex Shedding", I. Itoh et al., Flow Meas. Instrum., vol. 4, No. 4, 1993, pp. 215–223.

Primary Examiner—Richard E. Chilcot, Jr.
Assistant Examiner—Harshad Patel
Attorney, Agent, or Firm—Westman, Champlin & Kelly

[57] ABSTRACT

A vortex flow transmitter has a filtering circuit receiving a noise contaminated input signal representative of flow and which has a fundamental frequency varying responsively to flow. The filter filters the input signal using one of a family of HP and LP filter characteristics to produce a filtered signal. The amplitude of the filtered signal is proportional to the density of the fluid. Circuitry calculates mass flow of the fluid based upon amplitude and fundamental frequency of the filter output. The circuitry includes rectifying circuitry, summing circuitry, period counting circuitry, and a microprocessor.

14 Claims, 8 Drawing Sheets

VORTEX MASS FLOWMETER

This application is a continuation-in-part of U.S. patent application Ser. No. 07/954,513, now U.S. Pat. No. 5,372,046, "Vortex Flowmeter Electronics", filed Sep. 30, 1992.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to flowmeters, such as vortex shedding meters or swirlmeters which are responsive to a fluid flow. In particular, it relates to electronics for such meters which reduce noise in a flow responsive signal.

Flowmeters sense the flow of liquid and gases in conduits and produce a noise contaminated flow responsive signal. Under certain circumstances, the presence of an obstacle or shedder in a flow conduit causes periodic vortices. A vortex flowmeter produces shedding vortices from a bluff body. The frequency of these vortices is directly proportional to the flow velocity in the meter. The shedding vortices produce an alternating differential pressure across the bluff body at the shedding frequency. This differential pressure is converted to an electrical signal by piezoelectric crystals or other differential pressure devices. The magnitude of the differential pressure or electric signal is proportional to $\rho V^2$, where $\rho$ is the fluid density and $V$ is the fluid velocity. When the ratio of pipe diameter to the size of the shedding bar is held constant, the signal is proportional to $\rho D^2 F^2$, where $D$ is the inside diameter of the meter and $F$ is the shedding frequency. The flowmeter produces pulses having a frequency proportional to the flow rate. The swirlmeter produces a similar flow responsive signal by measuring the vortex precession frequency produced by swirling the flow, then passing the flow through a downstream contraction and expansion.

The vortex flowmeter signal comprises a fundamental signal which has a fundamental frequency representative of the flow and an associated noise signal at various frequencies caused by fluid turbulence and other unrepeatable factors such as pipe vibrations, common mode pressure variation and noise from acoustic sources. Pipe vibrations caused by pumps, motors and unsupported sections of pipe are usually in the 0 to 100 Hz range and common mode pressure noise in the 10 to 1000 Hz range, while acoustic noise is generally above 100 Hz. Fluid turbulence results in noise on both sides of the fundamental frequency. Because fluid turbulence noise generally increases in amplitude as the flow velocity increases, it is particularly troublesome when low frequency turbulent noise below the fundamental frequency is disproportionally amplified by signal processing electronics.

Flowmeters, like vortex shedding meters and swirlmeters, are designed for a variety of applications encompassing wide ranges of flow rates, pipe diameters and fluid densities. Consequently, such meters operate over a relatively large dynamic range. When fluid density is constant, the flow velocity range is typically 25 to 1. Even with the flow range at 25 to 1, signal amplitude will change by a ratio of 625 to 1, because the signal is proportional to the square of the velocity. When variable fluid densities are taken into account, which range between 1 and 800 in fluids such as atmospheric air to liquids, a frequency change of 100 to 1 is possible for a specific meter size and will result in a maximum signal amplitude range from 10,000 to 1. Unfortunately, the signal-to-noise ratio changes markedly over the ranges. Furthermore amplitude and frequency modulation of the flow signal introduces low and high frequency noise that causes problems for some signal conditioning systems. Consequently, a single filtering system is needed which improves variations in signal to noise ratio over a large dynamic range encompassing wide ranges of flow, density and diameter yet differentiates flow signal from unwanted noise.

In order to provide electronics to improve the signal to noise ratio over a large dynamic range, some electronics control the amplitude of the vortex signal through a feedback method. Other systems utilize a phase lock loop that averages phase errors. Both amplitude control and phase lock loop systems have a response time set to the lowest frequency or data rate. As a result, high frequency response suffers.

A method of using signal amplitude of the vortex shedding differential pressure signal to determine mass flow without a separate density measuring method is known. This method has several desirable characteristics, such as allowing calculation of mass flow without additional measuring instruments. Further, the method is independent of the fluid composition. A method for demodulating the AC mass flow signal into a DC signal is known. The method suffers from slow response time and problems with the inherent amplitude and frequency jitter of the vortex signal. It also requires an amplifier with a low pass characteristic. This amplifier is subject to significant temperature errors, increasing the low frequency noise due to its derivative function, as well as the ranging problems discussed above.

SUMMARY OF THE INVENTION

In a transmitter sensing differential pressure of a flowing fluid and transmitting an output representative of mass flow, calculation circuitry calculates mass flow based upon amplitude and fundamental frequency of a filtered output. A filter in the transmitter receives a noise contaminated input signal related to flow having a fundamental frequency varying responsively to flow. The filter filters the input signal with a current high pass (HP) filter characteristic and preset low pass filters and to produce a filtered signal having a frequency representative of flow. The frequency characteristic of the HP filter is selected from a family of preselected HP filters having varying corner frequencies. Each HP filter in the family has a unique switchup and a unique switchdown value assigned to it. Electronics in the transmitter include a timing circuit which provides a period timer value representative of the time between period boundaries of the filtered signal and also provide a present timer value representative of the elapsed time since a last period boundary of the filtered signal. The electronics also include an adaptive response circuit which selects a current HP filter characteristic for use in the filter. The adaptive circuit uses one selection method when the flow is increasing and another selection method when the flow is decreasing. The calculation circuitry includes rectifying circuitry, summing circuitry, period counting and timing circuitry and a microprocessor. The rectifying circuitry rectifies the filtered signal and the summing circuitry sums the magnitude of the rectified output while the period counting and timing circuitry counts periods and elapsed time of the counted periods in the filtered output. The microprocessor calculates mass flow using the frequency and average amplitude of the filtered output based upon outputs from the summing circuitry, period counting circuitry and a system clock. In one preferred embodiment, the mass flow calculating is corrected for error in the filtered output due to the transfer function of the filter.

DETAILED DESCRIPTION OF THE PREFERRED EMBODIMENTS

Figure 1:
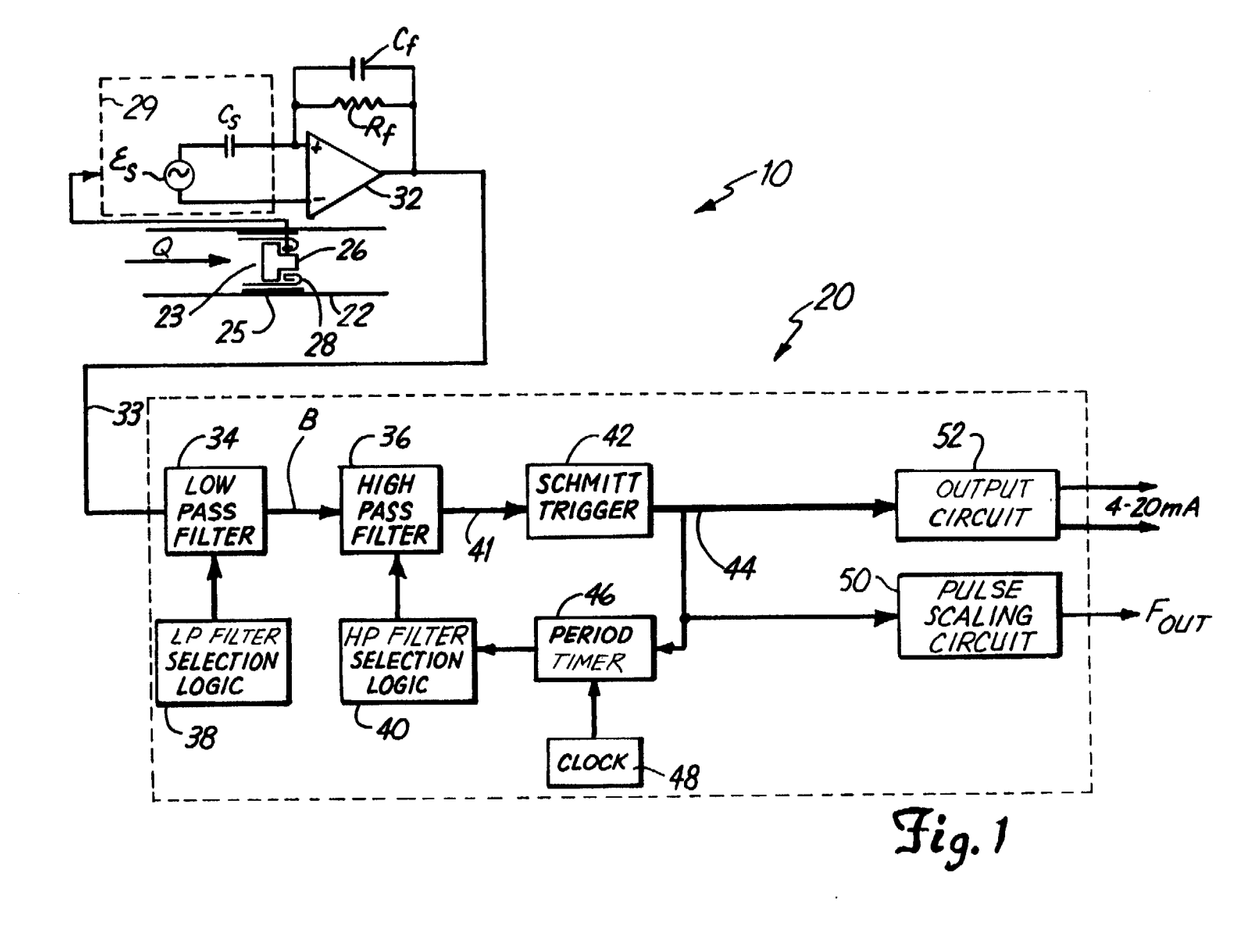
FIG. 1 is a block diagram of a vortex flowmeter in accordance with the present invention.

FIG. 1 shows a vortex flowmeter 10 including electronics generally indicated at 20 for conditioning a vortex sensor signal present on line 33. Electronics 20 increases the signal-to-noise ratio of signal 33 and produces both a 4–20 mA current representative of flow and a square wave output $F_{out}$ having a frequency proportional to the frequency of signal 33.

Electronics 20 are applicable to field mounted process control instruments which must respond to a wide dynamic range of input frequencies. Electronics 20 are particularly appropriate for meters sensing a physical parameter responsive to an exponent of the variable (such as a square) which the output represents. For example, both vortex flowmeters and swirlmeters measure fluid flow by sensing an amplitude modulated pressure signal whose frequency is proportional to the flow and output a signal representative of the flow rate.

A liquid or gas fluid 23 creates a flow, Q, through a pipe 22. A vortex meter housing 25 having a bluff body 26 therein is located in pipe 22. When fluid 23 flows past body 26, shedding vortices 28 having a frequency representative of the flow are produced. Bluff body 26, or subsections thereof, move in response to the pressure difference across bluff body 26 due to the vortex shedding. Movement is sensed by, for example, a piezoelectric sensor shown at 29. Sensor 29 has source characteristics approximated by a potential source $E_s$ and a series capacitor $C_s$. The magnitude of the output signal from the piezoelectric sensor is proportional to the differential pressure, which is proportional to $\rho V^2$, where $\rho$ is the fluid density and V is the velocity of fluid 23, and also proportional to $\rho D^2 F^2$, where D is the inside diameter of meter housing 25 and F is the shedding frequency.

Figure 2A:
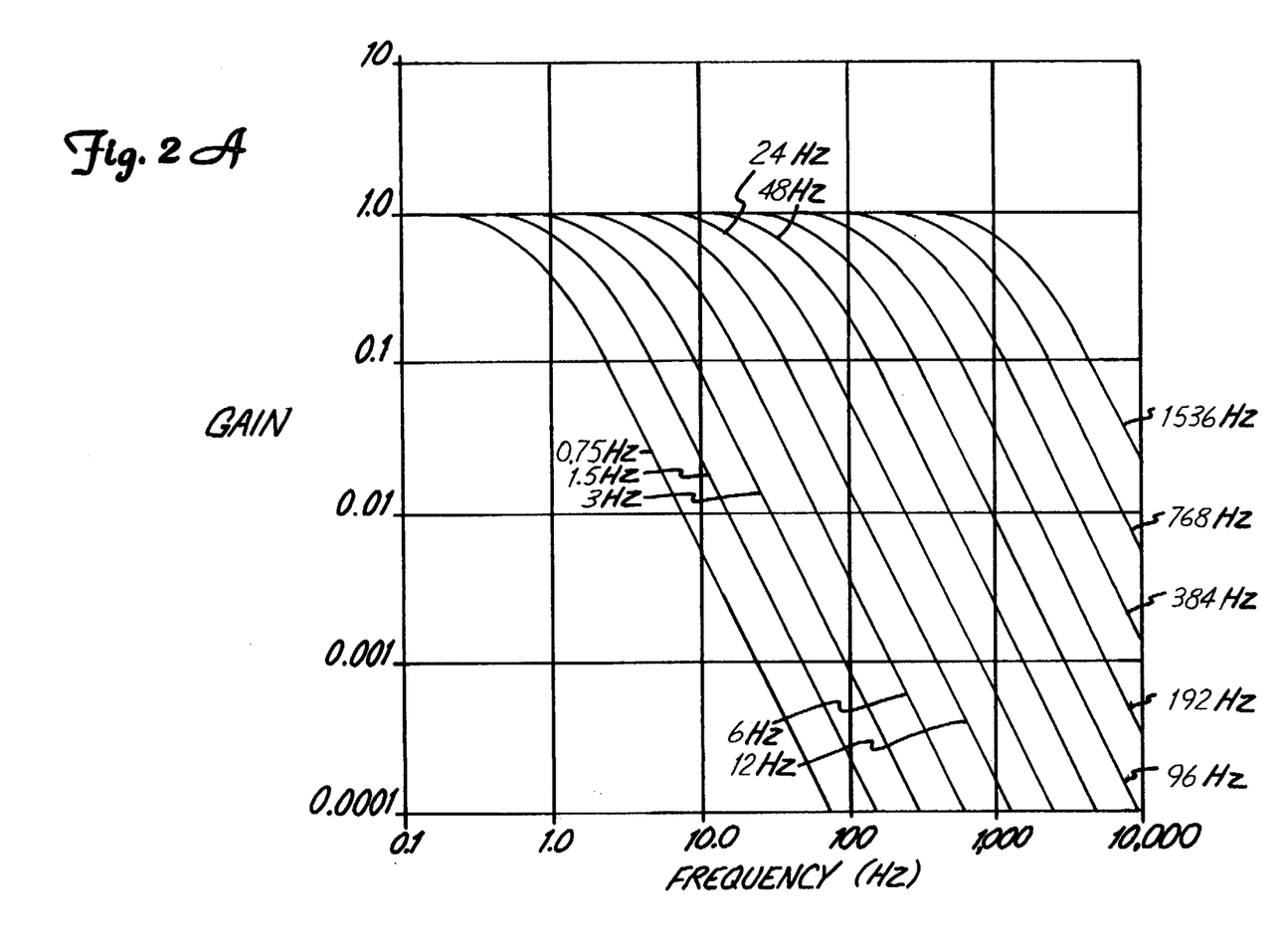
FIGS. 2A and 2B are graphs of the frequency responses of a two pole low pass filter and a four pole high pass filter having selectable frequency characteristics in accordance with the present invention.

The output of the piezoelectric sensor is coupled to an amp 32 which includes capacitor $C_F$ and resistor $R_F$ and outputs vortex sensor signal on line 33. Adjustable two-pole low pass (hereinafter LP) filter 34 conditions the vortex sensor signal present on line 33 to remove undesirable high frequency noise. The corner of LP filter 34 is set at or slightly below the lowest vortex sensor fundamental frequency expected in a specific application and therefore needs only to be set once per application. FIG. 2A shows the frequency responses for each of the preselectable LP filter 34 characteristics, specifically set in this embodiment of the invention for corner frequencies between 0.75 and 1536 Hz.

Filter 34 has a $1/F^2$ response above the low corner frequency and therefore the amplitude of the output of filter 35 is substantially independent of fundamental frequency, or flattened, at frequencies above the selected low frequency corner. This flattening phenomenon is desirable because it attenuates noise occurring at higher frequencies (which may be at larger amplitudes) more than it attenuates the vortex sensor signal 33 and provides a more consistent signal to noise ratio over a given flow range. As a result, LP filter 34 prevents the flowmeter from needlessly responding to noise at higher frequencies than signal 33 because of the flattening phenomenon.

Figure 2B:
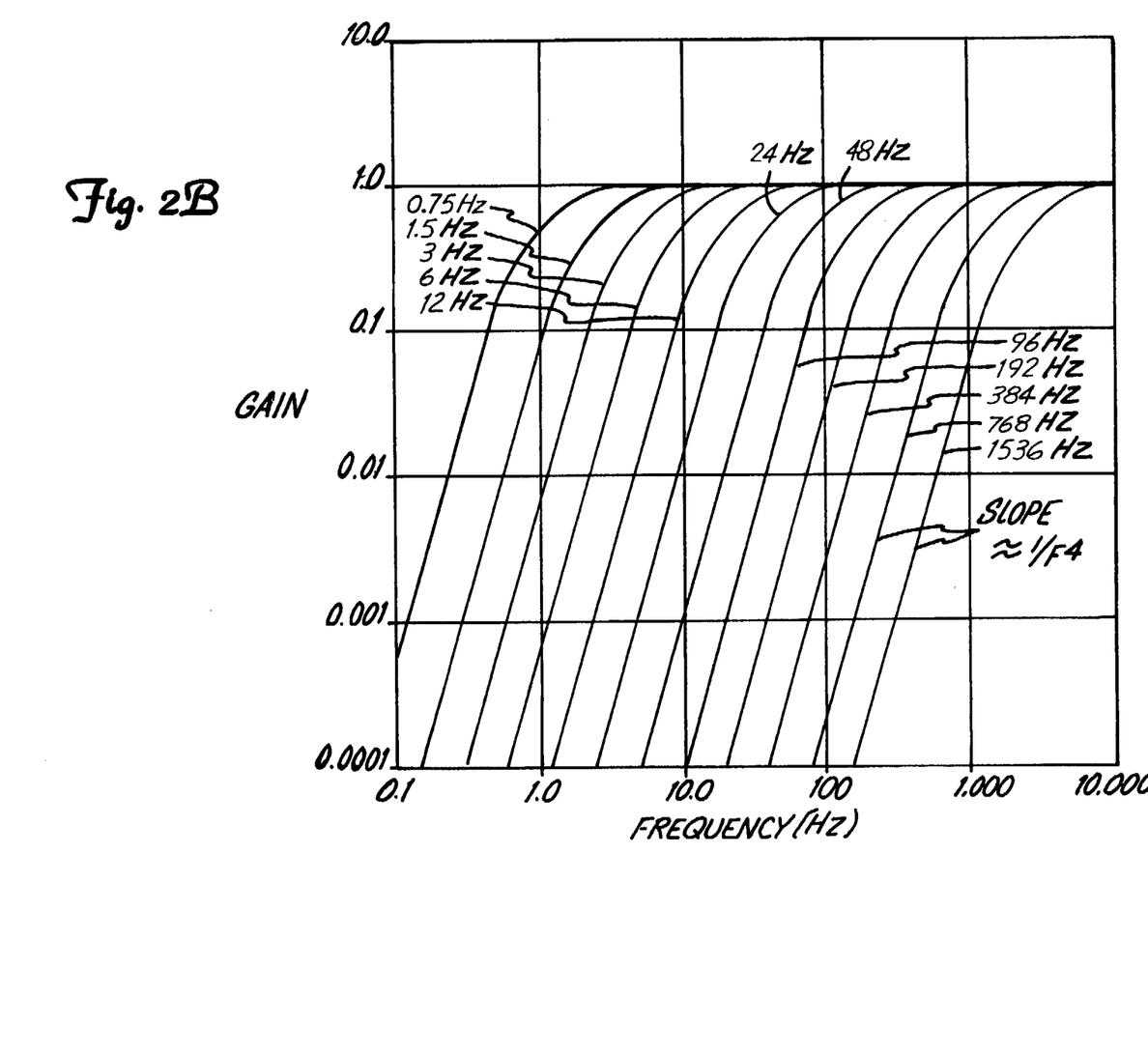

FIG. 2B shows the frequency response of four-pole high pass (hereinafter HP) filter 36 for each preselectable HP corner frequency. The family of LP and HP filter characteristics shown in FIGS. 2A and 2B is chosen as appropriate for the maximum and minimum flows, the fluid density, and the meter size anticipated for use with electronics 20. Filter 36 attenuates the low frequency noise which LP filter 34 does not attenuate and produces a filtered signal at 41. The frequency response of filter 36 has four poles because of the effective loss of two poles from filter 34 in the frequency range from the LP corner to the HP corner. The HP corner frequency is typically larger than the LP corner frequency in order to provide more noise immunity for low frequency noise. Without filter 36, this low frequency noise present at the output of LP filter 34 would be particularly troublesome at high flow rates when the low frequency noise has an amplitude greater than the amplitude of the vortex signal which would interfere with vortex signal acquisition.

Schmitt trigger 42 squares the output of HP filter 36 to produce a square wave signal on line 44, which has a frequency substantially equal to the fundamental frequency of vortex sensor signal 33. Schmitt trigger 42 is a bistable pulse generator having a high output voltage when the input voltage is greater than a switchup threshold voltage and a low output voltage when the input is less than a switchdown threshold voltage. The switchup and switchdown thresholds provide hysteresis for noise immunity. The voltage at which the output of trigger 42 changes state is preferably set to approximately twenty-five percent of the voltage level measured at signal 41. The measurement should be performed over the flattened section of the response found at frequencies above the low frequency corner of filter 34 in order to provide a more stable square wave output.

Period timer 46, clocked by clock 48, provides an elapsed time since a last period boundary of output signal 44 to HP filter selection logic 40. The elapsed time typically corresponds to the time since the last rising edge of signal 44, but alternatively may be made over more than one period to reduce the effect of jitter on HP filter selection. Jitter refers to the random variation in the main frequency component of the vortex signal 33. Averaging over several periods increases the response time to flow transients.

Figure 3:
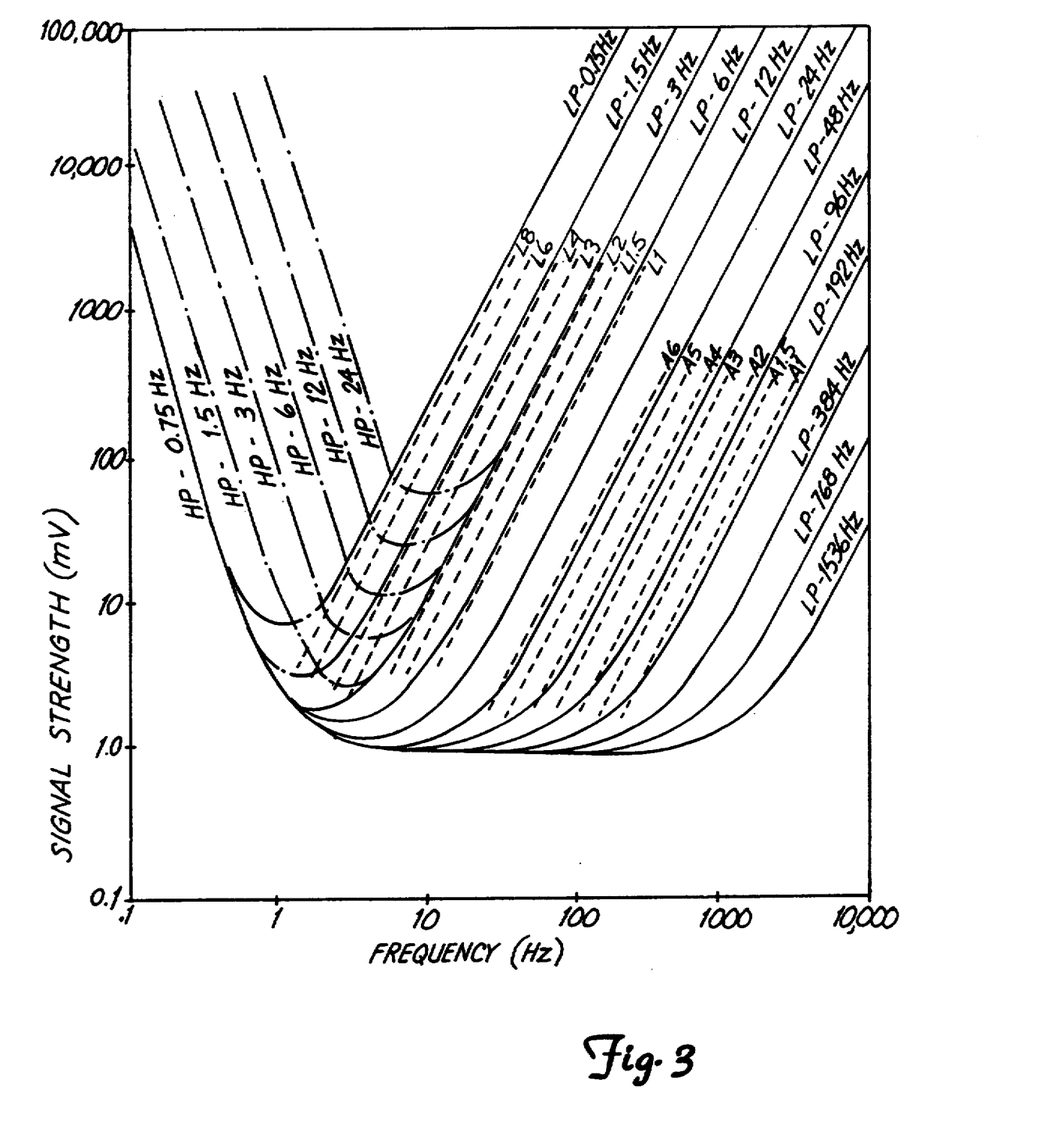
FIG. 3 is a graph of input signal level versus frequency for a bandpass filter, as if acting at the input of the filter and Schmitt trigger combination with two families of vortex meter flow curves superimposed thereon.

FIG. 3 shows the set of preselectable LP filter attenuation characteristics (in solid lines) between 0.75 Hz and 1536 Hz. The family of HP filter attenuation characteristics (in dotted/dashed line) is provided only for the 3 Hz LP characteristic. For this example, the 3 Hz LP characteristic corresponds to LP filter 34 and one of the characteristics of the HP family corresponds to HP filter 36. The envelope formed by the 3 Hz LP characteristic and whichever HP characteristic is selected defines the area where signal 41 has an amplitude large enough to exceed the voltage threshold necessary to make the output of trigger 42 change state. Superimposed on these filter characteristics are the flow curves for two families of pipes. Curves L1–L8 are for pipes carrying liquids of density 62.4 lb/ft$^3$ at atmospheric pressure and ranging in diameter between one and eight inches. Flow curves A1–A6 are for a family of pipes carrying air at atmospheric pressure and ranging in diameter between one and six inches. Increasing fluid density moves the curves vertically upward for the same velocity range and increasing diameter moves the curves to the left for the same velocity range. As the magnitude of the output signal of vortex signal 33 is proportional to $\rho D^2 F^2$, each application will typically have a different flow curve. Increasing flows are represented as successively higher operating points on the same flow curve. Once the flow curve for the instant application is substantially known, the proper LP filter characteristic can be selected.

There must be enough of an amplitude margin between the flow curve and the LP characteristic to provide for stable operation of Schmitt trigger 42. A margin of 4:1 between the amplitude of signal 41 to the voltage required to trigger Schmitt trigger 42 is preferred to allow for small amplitude modulations and for filter switching transients.

Figure 4:
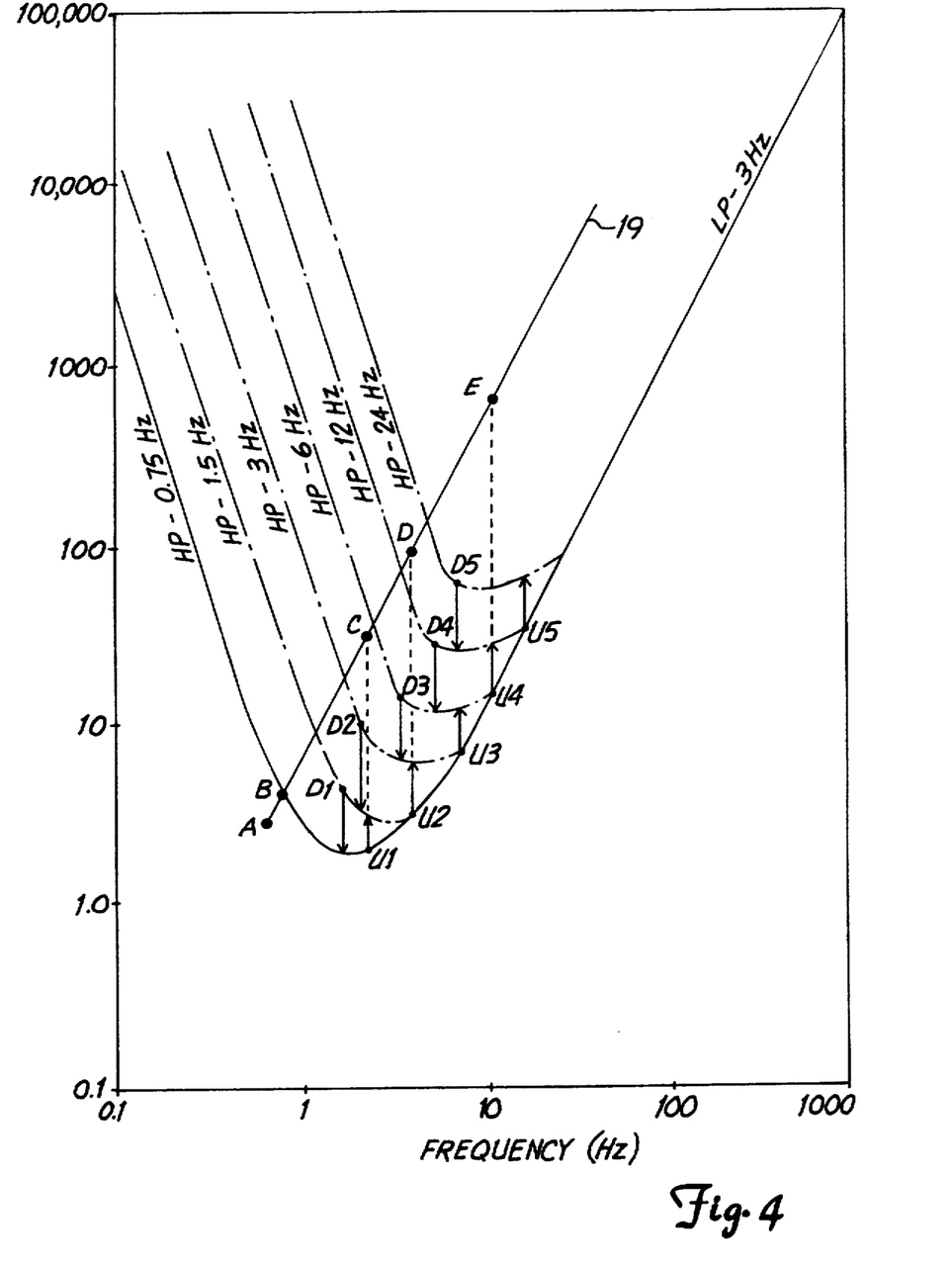
FIG. 4 is a graph of input signal level versus frequency for a combined bandpass filter, having the 3 Hz LP characteristic selected, as if acting at the input of the filter and the Schmitt trigger, with a single flowmeter curve superimposed thereon.

FIG. 4 shows a single LP filter characteristic (a 3 Hz filter characteristic) and a family of HP filter characteristics (0.75 Hz, 1.5 Hz, 3.0 Hz, etc.). Superimposed on these filter characteristics is an operating curve for a pipe of eight inch diameter carrying liquid of density 62.4 lbs/ft$^3$, indicated at reference designator 19. Points A, B, C, D and E represent different operating points on curve 19. Point A has the lowest flow of the five points and points B, C, D and E have successively faster flow rates. As discussed above, the envelope formed by the 3 Hz LP characteristic and whichever HP characteristic is selected defines the area where signal 41 has an amplitude large enough to exceed the voltage threshold necessary to make the output of Schmitt trigger 42 change state. For example, consider application of signal 33 to the combination of filter 34,36 and trigger 42 when the 0.75 LP characteristic is selected for filter 34. If signal 33 were of the amplitude and frequency represented at point A on curve 19, signal 44 would be a constant voltage, whereas application of signal 33 represented at point C on curve 19 would result in a square wave signal at signal 44.

HP filter selection logic 40 recognizes two switchpoints corresponding to each of the preselected HP filter characteristics (a "switchup point" and a "switchdown point") and recognizes which HP filter characteristic is currently used in HP filter 36, (the "current filter characteristic"). Each switchpoint represents a timer value representative of a frequency at which logic 40 should select a new filter characteristic. Logic 40 continually monitors the value of period timer 46, (the "present timer value"). The switchup and switchdown point for each preselectable filter characteristic introduce hysteresis, which minimizes excessive filter switching caused by frequency jitter in vortex signal 33.

When the flow increases from a no-flow condition in pipe 22, signal 44 becomes a square wave at point B. HP filter characteristic 0.75 Hz is set by default. Period timer 46 is reset by a period boundary of signal 44 and consequently represents the elapsed time since the last period boundary of signal 44. When the present timer value at the end of a signal 44 period, (the "period timer value"), is less than a switchup point corresponding to the HP filter characteristic having the next highest frequency corner, logic 40 immediately selects the filter with such next higher frequency corner for use in filter 36. For example, when the flow has increased to point C, the period timer value at the end of a signal 44 period is less than the switchup point corresponding to the 1.5 Hz HP filter characteristic shown at U1 and logic 40 will immediately select the 1.5 Hz characteristic. When flow increases to point D, the period timer value at the end of a signal 44 period is less than the switchup point corresponding to the 3.0 Hz HP filter characteristic shown at U2 and logic 40 immediately selects the 3.0 Hz characteristic. As the flow increases to point E on curve 19, the 6.0 Hz HP filter characteristic is chosen using the same selection process. The response time of electronics 20 when successively higher frequency corner HP filters are selected decreases as the flow increases. In summary, logic 40 selects the filter characteristic having the next higher corner frequency relative to the corner frequency of the current filter characteristic when the period timer value, as sampled when signal 44 changes state, is less than the switchup point for such next higher corner frequency filter.

This selection process selects a filter having a corner one step away in frequency from the corner of the current filter characteristic. An alternative selection process can be configured to select a filter characteristic more than one step away in corner frequency than the current filter characteristic. In such a selection process, logic 40 compares the period timer value at the end of a period of signal 44 to the set of switchup points and selects the filter characteristic having a corner corresponding to the higher of the switchup points which bound the period timer value.

A different selection process is used for decreasing flows. Logic 40 compares the present timer value and the switchdown point assigned to the HP filter characteristic having the next lower frequency corner than the current filter characteristic. When the flow decreases and the point on curve 19 moves from point E through point D towards point C, the 6 Hz HP characteristic continues to be used as the filter characteristic of filter 36 until the present timer value exceeds the switchdown value assigned to point D3, at which time logic 40 selects for immediate use in filter 36 the 3 Hz HP characteristic. This same process continues as the flow decreases and the present timer values exceed successively larger switchdown values assigned to switchdown points D2 and D1, respectively, without receiving a period boundary to initiate selection. In summary, for a decreasing flow, logic 40 selects the filter characteristic having the next lower corner frequency relative to the corner frequency of the current filter characteristic when the present timer value exceeds a switchpoint corresponding to the filter characteristic having such next lower corner frequency. In other words, the corner frequency of HP filter 36 is adjusted in response to the frequency of signal 44 and selection logic 40 sets the filter corner frequency adequately below the frequency of signal 44. This method of selecting filter characteristics continues without resetting timer 46 until signal 44 changes state or until the filter characteristic having the lowest possible corner is activated, in which case timer 46 is stopped to avoid overflow. The next period boundary restarts timer 46. A small timing error results from the delay to set the HP filter 36 before timer 46 is reset, which is compensated by resetting timer 46 to the delay time instead of setting it to zero or by providing a latch to hold the value of counter 46 and restarting the timer.

The hysteresis effected by this method of filter characteristic selection ensures that a currently selected filter characteristics is selected over a broad range of frequencies. For example, signal 44 frequencies corresponding to timer values between U5 and D4 are filtered by the 12 Hz HP characteristic. Similarly, signal 44 frequencies corresponding to timer values between D2 and U3 are filtered by the 3 Hz characteristic. This feature ensures that frequency jitter of vortex signal 33 will cause minimal filter switching and therefore reduce undesirable noise.

Although the above discussed filter corners are selected to be separated in frequency by a factor of two, alternate arrangements are acceptable. A family of HP filters having corner frequencies separated by factors of the fourth root of two is preferred since it provides less sensitivity to noise and is convenient for a digital implementation of the filtering function.

The adaptive filter response disclosed above is considered open loop since changing the filter corner frequency has no affect on the period measurement which controls the filter. Adaptive response time allows one set of electronics 20 to be used for all meter sizes and flow ranges, even though the dynamic range of a vortex flowmeter varies from 1 Hz for 8" diameter meters carrying liquid to 6000 Hz for ½" diameter meters carrying gases.

Alternate vortex signal conditioning methods have disadvantages. Automatic gain control methods modify filter characteristics based on the amplitude of a vortex sensor output and consequently can track noise instead of the flow signal. Those methods utilizing a HP tracking filter experience a loss of pulses during fast reductions in flow rate. In such electronics, a decreasing flow transient causes the HP filter to attenuate the flow signal because the time required for the tracking filter to change to a new filter selection was longer than the flow transient. The time constant is necessarily set by the lowest flow frequency and is therefore too large at high flow frequencies. This caused a loss of pulses, and consequently of flow rate output during such a transient. If, on the other hand, the HP filter corner was far from the vortex flow frequencies to avoid attenuation during a decreasing flow transient, then the effectiveness of the filter was reduced. The present invention avoids these transient problems due to both its unique self-adapting response time and the method by which HP filter characteristics are selected in the absence of a period boundary of signal 44, since the response time of the electronics decreases as the frequency of vortex signal 33 increases. This means that the electronics respond faster at high flow rates than they do at low flow rates.

The user initiated LP filter selection logic 38 selects a corner frequency for LP filter 34 as a function of the diameter of pipe 22 and the density of fluid 23. This selection is typically performed once during an application and needs to be changed, for example, when a meter size is changed or when fluid density is substantially changed. The corner can be selected via a hand-held communicator over a current loop, operator set manual dip switches, or an automated process which allows flowmeter 10 to select its proper setting and provide maximum noise immunity. For an automated setting, a flow rate is set in pipe 22 is which is approximately half the maximum flow rate for flowmeter 10. The operator then initiates the flowmeter's automatic LP filter selection process. Flowmeter 10 lowers the corner of LP filter 34 until the signal 44 is no longer a square wave. The corner frequency of LP filter 34 is then increased by a factor of approximately two to provide a factor of four between trigger 42 output and the Voltage required for Schmitt trigger 42 to change state. A factor of approximately two is chosen because of the $1/F^2$ response on filter 34, which provides a factor of four change in amplitude. With proper communications electronics, selection and adjustment of the LP filters can be automatically achieved with an initiation command from an operator over a two wire current loop, after a stable midrange flow with an adequate signal to noise ratio has been established.

Pulse scaling circuit 50 converts square wave signal 44 into $F_{out}$, which is representative of flow rate corresponding to a convenient unit of measure such as pulses per gallon. Circuit 50 is preferably digital in order to improve accuracy, provide a wide range of multiplication factors and space the output pulses evenly. Output circuit 52 converts square wave signal 44 into a 4–20 Ma current representative of the flow. Circuit 52 is coupled to a current loop commonly used in the process control industry. Some flowmeters have an alternate embodiment of output circuit 52 which outputs digital information, representative of flowmeter status parameters and flow, superimposed on the 4–20 Ma current line or power line.

Figure 5:
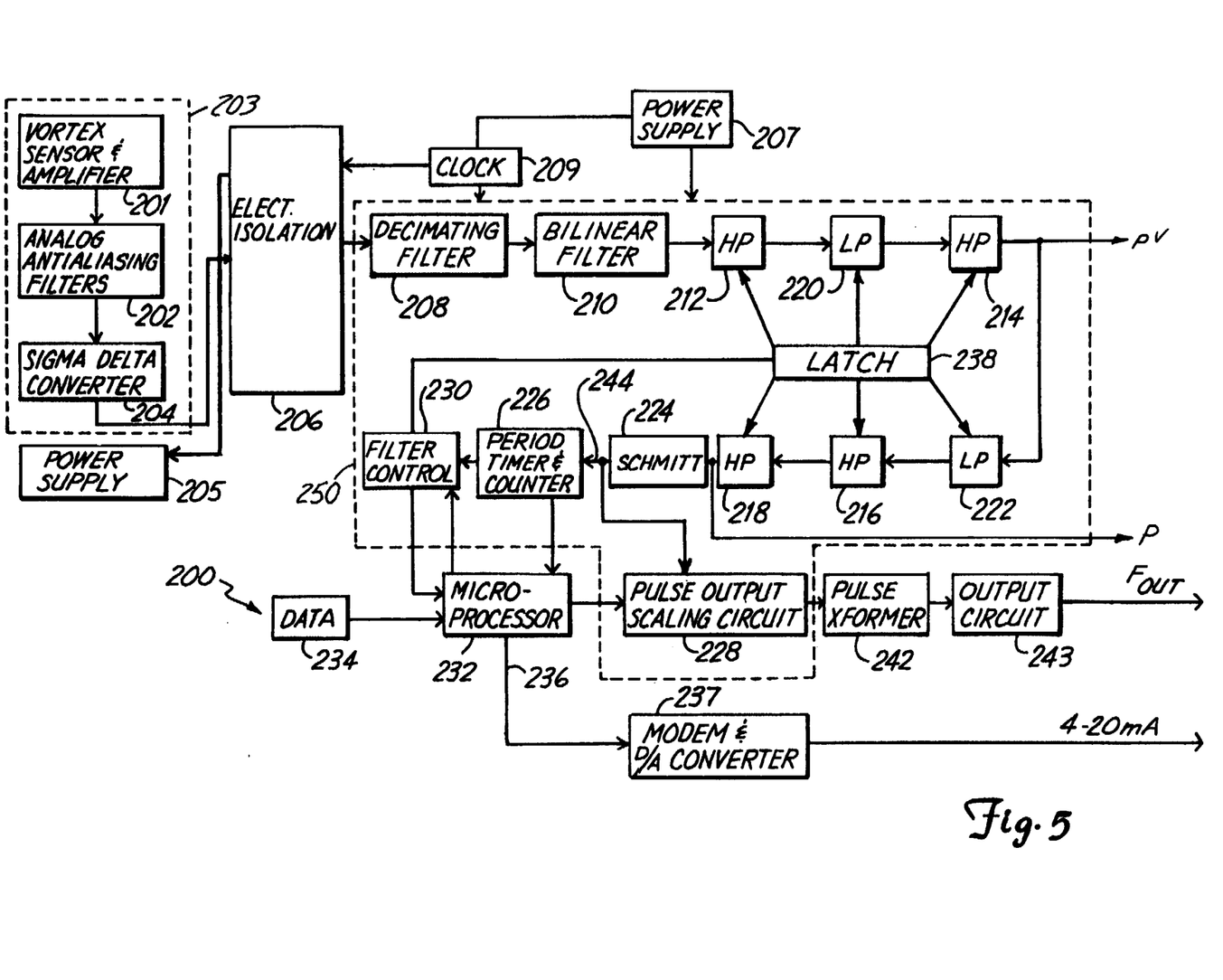
FIG. 5 is a block diagram of an alternate embodiment of vortex flowmeter in accordance with the present invention.

A digital embodiment of the present invention utilizing digital filters is indicated generally at 200 in FIG. 5. A digital implementation of the function described for flowmeter 200 is preferred because it is more powerful and flexible than analog filtering and can be under direct software control of a microprocessor in a transmitter. Input circuitry 203 includes sensor and amplifier 201, filter 202 and sigma-delta converter 204. An analog anti-aliasing filter 202 receives the analog signal from a vortex flow sensor and amplifier 201. Filter 202 filters the sensor signal to remove unwanted high-frequency noise and performs anti-aliasing filtering.

Sigma-delta converter 204 samples the vortex signal at approximately 307.2 kHz and outputs a single bit datastream at 307.2 kHz which is representative of the amplitude and frequency of the output of vortex sensor and amplifier 201. There are no word boundaries in the datastream. The relative number of ones and zeros, sometimes called the bit density, is representative of the amplitude of the vortex signal. Converter 204, which is preferably implemented in a CMOS ASIC to minimize power, cost and size, is particularly suited to digitizing AC signals in the one to ten kHz range which is a typical frequency range for vortex flow sensors. A sigma-delta converter simplifies electronics since circuits which synchronize the transmission of a data words or circuits which count the number of bits in a word are unnecessary. Preferably the output datastream has a frequency approximately 100 times greater than the typical maximum vortex frequency, which is between 1–6 kHz. Oversampling of the signal moves quantization noise to higher frequencies. Subsequent digital filtering and decimation simplifies the anti-aliasing requirements and maintains the quantization noise inherent in sigma-delta converters at higher frequencies than the maximum vortex frequency. The sampling rate is chosen to be as low as possible to reduce power yet still have low noise amplitude in the vortex frequency band. This serial high-frequency format is ideal for transmission across an electrical isolation barrier 206 required for sensors which are grounded or have resistive leakage to ground due to high temperature loss of insulation resistance. Such sensors are typically used in vortex flowmeters to reduce cost and simplify connections. Furthermore, the single bit datastream enables an inexpensive, compact transformer or capacitor to be used in isolator 206. Other isolation media are acceptable such as optical, piezoelectric/acoustic and magnetostrictive isolation means.

Two signals are transmitted across isolation 206. A power supply 207 supplies power to a clock 209 whose output signal is passed through isolation 206 and from there to power supply 205, which squares the clock signal and provides the squared signal to circuits 201–204. The clock signal is also rectified and voltage regulated to operate as a power source for circuits 201–204. This arrangement also synchronizes clocks on both sides of barrier 206. Secondly, the serial bitstream from converter 204 is passed through isolation 206 in the other direction to a digital decimating filter 208. Isolator 206 isolates the grounded vortex sensor from the 4–20 Ma current loop of the flowmeter to avoid noise and currents in ground loops. Decimating filter 208 increases the width of the data word from one bit wide to ten bits wide and reduces the sampling frequency by a factor of ten to 30.72 kHz. Filter 208 reduces the amplitude of quantization noise and prevent aliasing of higher frequency signals caused by the decimation. The decimation factor is chosen so the decimation sampling rate is five to eight times greater than the highest frequency of the vortex signal in order to use simple digital filters in subsequent stages. Output of decimating filter 208 is received by a LP infinite impulse response filter (IIR) (bilinear filter) 210 that was designed by a bilinear transformation from the analog to digital domain, using coefficients of ½ and ¼ to allow register shifting to replace multiplying circuits. IIR filter 210 has a zero at one half the 30.72 kHz sampling frequency and a 3,259 Hz corner frequency chosen to be at the upper end of a typical frequency output for a one inch flowmeter. Thus, filter 210 does not attenuate the flow signal, but minimizes unwanted high frequency quantization noise present in the sigma delta converter. The decimating and bilinear filters are not required when other methods of analog to digital conversion are used.

Infinite impulse filter (IIR) (HP filter) 212 receives the output of IIR filter 210. Filters 212–222 are serially cascaded in the following order: filter 212, filter 220, filter 214, filter 222, filter 216, and then filter 218. Each filter digitally approximates a single pole low pass filter or a single pole high pass filter. An analog implementation of the circuit would also use two LP filters and four HP filters each having a single pole. HP and LP filters 212–222 are cascaded in this fashion to reduce transients caused when HP filter characteristics are switched by microprocessor 232, since HP filter transients have high frequency components which are not attenuated by succeeding HP filters. Otherwise, the digital equivalent of Schmitt trigger 224 may produce undesired extra output pulses. By interleaving the HP and LP filters as indicated, this transient effect is attenuated sufficiently to substantially eliminate the effect. Schmitt trigger 224 receives the output of filter 218 which generates a square wave vortex signal 244 having substantially the same frequency as the frequency of the output of vortex sensor and amplifier 201. Timer and period counter 226 outputs the elapsed time since a last period boundary of signal 244 to filter control 230, and the time between period boundaries of signal 244. The function of counter 226 with respect to the elapsed time is equivalent to the function of timer 46 in FIG. 1.

Logic 230 operates similarly to HP selection logic 40. Logic 230 receives switchup and switchdown values corresponding to each of the preselectable HP filter characteristics from microprocessor 232 and recognizes which HP filter characteristic is currently used in each of the HP filters 212,214,216,218, (the "current filter characteristic"). As discussed above in conjunction with FIG. 3, there is a switchup and a switchdown value associated with each HP filter characteristic. Logic 230 also continually monitors the value from period timer and counter 226, (the "present timer value"). For an increasing flow, logic 230 sends an interrupt to microprocessor 232 when the filter characteristic having the next higher corner frequency relative to the corner frequency of the current filter characteristic when the present timer value, as sampled at a period boundary of signal 244, is less than the switchup point for such next higher corner frequency filter. For a decreasing flow, logic 230 interrupts microprocessor 232 when the filter characteristic having the next lower corner frequency relative to the corner frequency of the current filter characteristic when the present timer value exceeds a switchdown value corresponding to the filter characteristic having such next lower corner frequency. The adaptive filter response of filters 212–218 is open loop since changing the filter corner frequency has no affect on the period measurement which controls the filter.

It is preferable for each filter to have a single variable pole, so that the corner frequency of the combined filter output has finer frequency resolution than if a single multiple-pole filter corner frequency were chosen. For example, four single HP filters each having independently variable corners have a combined corner frequency characteristic which changes as the fourth root of two, whereas a single four pole filter would have a corner characteristic variable in factors of two. Use of shift registers to perform multiplication is another simplifying design choice which reduces power consumption and the number of digital gates needed for each filter. As the digital filter output is the sum of first order terms each consisting of the product of a coefficient and a variable, when the coefficients multiplying the variables are chosen to be factors of one-half, only shift registers are required where a full multiplier circuit would otherwise be needed. For this reason, corner frequencies are only adjustable in factors of two. It is also preferable to implement the filters and associated circuitry placed within dashed box 250 into an ASIC to conserve power and for ease of assembly.

Microprocessor 232 calculates appropriate corner frequencies for filters 212-222 and sends corner selection commands representative of the proper HP filter characteristic to filter control 230 and to filter selection latch 238. Latch circuit 238 distributes filter selection values to filters 212-222. Microprocessor 232 also performs supervisory functions, optional output conditioning and required communications between the flowmeter and a process control system which receives the flowmeter output. An example of a supervisory function is disabling filter tracking, whereas examples of output conditioning are setting damping and alarm limits, and low flow cutoff, depending on user preference data contained in application data block 234.

Signal 244 operates timer and a period counter 226 which interrupts microprocessor 232 with data representative of the frequency of signal 244. The interruption occurs approximately every tenth of a second or once each period of signal 244, whichever represents the longer amount of time. After interruption, microprocessor 232 calculates an updated vortex frequency and provides such output digitally on output 236. Converter and modem 237 converts the digital information encoded on output 236 to a 4-20 mA current representative of the flow. Other output formats, such as Fieldbus or other process control industry standard communications formats can be used as appropriate. Microprocessor 232 also provides a signal to pulse output scaling circuit 228 which provides the necessary signals to operate a pulse transformer 242. Pulse transformer 242 provides an electrically isolated signal to output circuit 243. Circuit 243 provides a frequency output $F_{out}$ representative of the flow.

Another aspect of the invention provides a method and apparatus for converting the amplitude and frequency of the vortex sensor signal ($V_0$) into a flowmeter output representation of mass flow with enhanced noise rejection produced by the above filtering techniques. This produces a mass flow measurement with small errors due to noise and provides fast dynamic response. Digital filtering is employed in a preferred embodiment.

With the use of the signal amplitude of the vortex signal, the measurement of mass flow is greatly simplified since fluid density does not need to be known. However, the invention is also capable of providing a fluid density output if desired. The basic equation describing the differential pressure caused by vortex shedding is:

$$\Delta P = \frac{1}{2} C_P \rho V^2 \cos(2\pi F t) \quad \text{Equation 1}$$

where $\Delta P$ is the alternating differential pressure of the vortices, $\rho$ is the density, V is the velocity, $C_p$ is the pressure coefficient which is dependent on Reynolds number, F is the shedding frequency of the vortices, and t is elapsed time. The amplitude of the sensor signal, $V_0$, is proportional to $\Delta P$ and can be used to determine mass flow (M) and density ($\rho$), as described below.

The amplitude of the pressure signal $V_0$ on line 33 can be expressed in several ways since $F = K_L V$. These are:

$$V_0 = K_0 \rho V^2 = K_M \rho V F = K_N \rho F^2 \quad (2)$$

where $V_0$ is the amplitude of the vortex sensor signal, $K_0$, $K_M$ and $K_N$ are proportionality constants, and V, F, and $\rho$ are defined above. Passing the sensor signal $V_0$ through the digital filters 208-222 (in FIG. 5) imparts amplitude and phase changes depending on the frequency response of digital filters 208-222. This frequency response can be determined by analytical methods and is a function of the sample frequency, the signal frequency, and the filter coefficients (i.e. corner frequencies). The filter coefficients are determined by microprocessor 232 when it selects the proper filter characteristic for the application, as discussed above.

Substitution of the relationship $M = \rho V$ into Equation 2 yields:

$$M = V_0 / K_M F \quad (3)$$

Solving equation 2 for $\rho$ yields:

$$\rho = V_0 / K_N F^2 \quad (4)$$

These equations can be solved using outputs from the circuitry of FIG. 5. Note that the equations are based on unit area; each meter size would have a fixed constant to allow for the meter size.

FIG. 5 shows the digital tracking filter system described above. A first output from filter 214 is proportional to $\rho V$ and a second output from filter 218 is proportional to $\rho$. The signal entering HP filter 212 is proportional to $\rho V^2$. The LP filters 220 and 222 effectively divide the input of each respective filter by F, whereas the function of HP filters 212, 214, 216 and 218 is to remove unwanted low frequency noise. Consequently, as V is proportionally related to F, the signal exiting HP filter 218 is proportion to $\rho$. The action of high pass filters 212, 214, 216, 218 removes low frequency noise. Thus, the $\rho$ and $\rho V$ signals are substantially stripped of the noise components.

The $\rho$ and $\rho V$ signals are cosine waves at the shedding frequency F and require demodulation or rectification and averaging to determine their average amplitude. Additionally, filters 208-222 each have a transfer function and therefore a correction should be applied to the $\rho$ and $\rho V$ signals, as described below. This is well suited for implementation with digital filters, and a digital implementation is a preferred embodiment.

Figure 6:
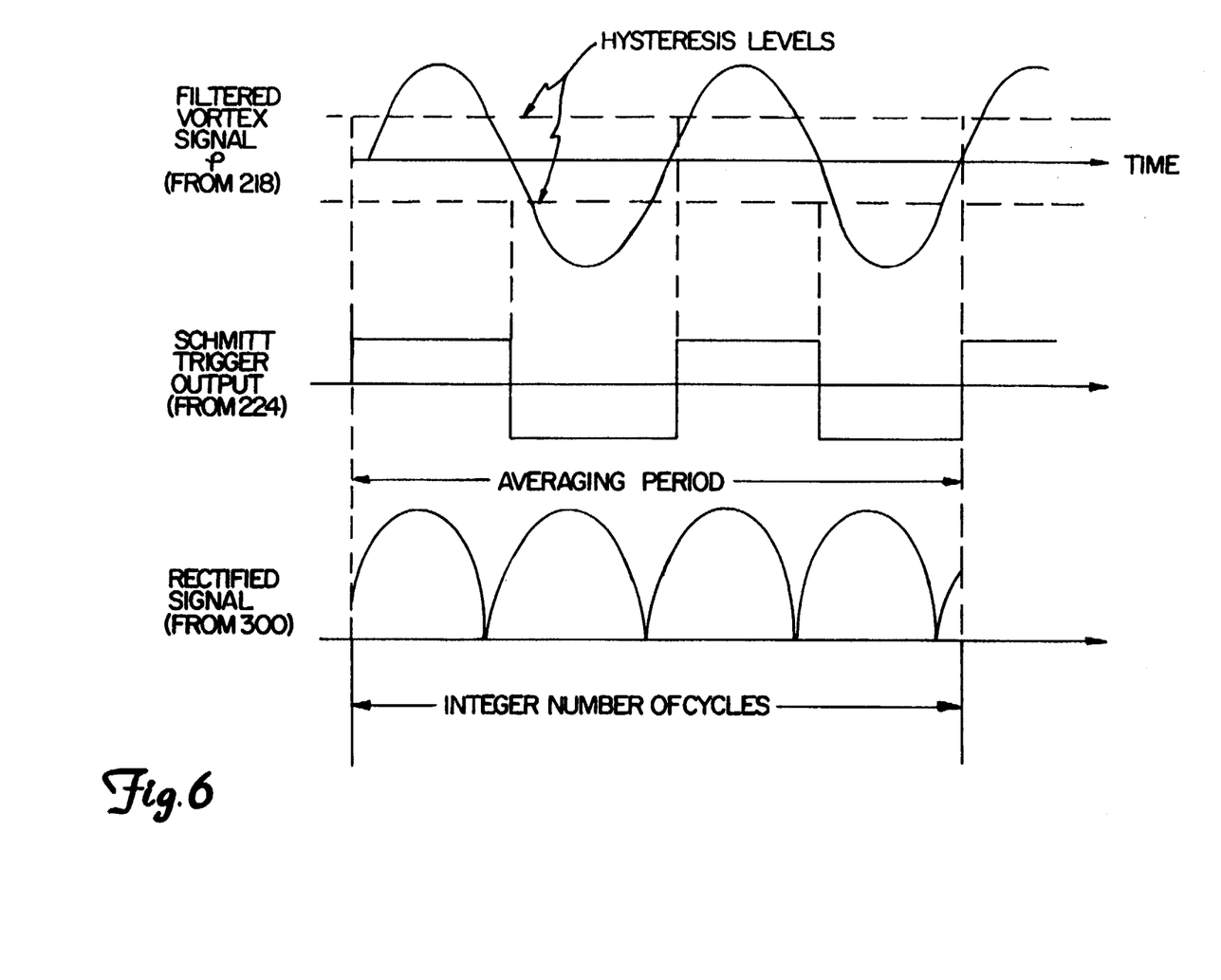
FIG. 6 shows signal waveforms from circuitry in FIG. 5.

FIG. 6 shows the $\rho$ proportional signal as a cosine wave whose amplitude is proportional to $\rho$. The output from Schmitt trigger 224 is shown relative to the $\rho$ signal. (The $\rho V$ signal is the same except for amplitude and phase.) FIG. 6 also shows a rectified signal which is from magnitude generator 300 of FIG. 7.

The signal from generator 300 is summed over a period identified as the "Averaging Period" in FIG. 6 which is an integer number of periods of the $\rho$ signal. In the described digital implementation, rectification and averaging is by the following formula:

$$\text{Average Value} = \frac{\sum_{N=1}^{N=J} |y(N)|}{J} \qquad \text{Equation 5}$$

where |y(N)| is the magnitude of the sampled values of the $\rho$ or $\rho V$ signal and J is the number of values.

Figure 7:
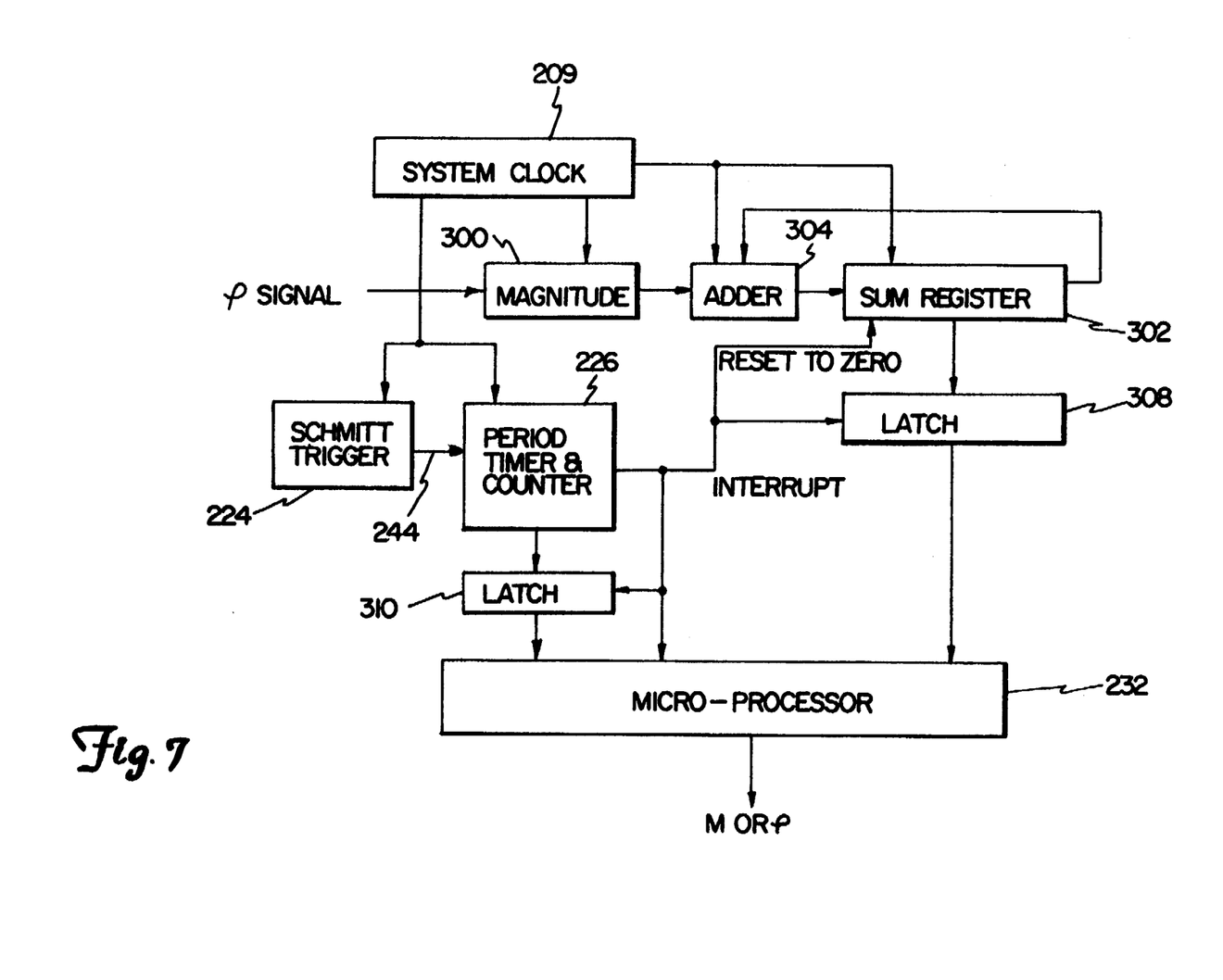
FIG. 7 shows an averaging system used to calculate mass flow in accordance with the invention.

FIG. 7 shows one technique to implement Equation 5. Either the $\rho$ or $\rho V$ signal is input into magnitude generator 300 where all the negative numbers are made positive and the positive numbers are left positive, thereby effectively rectifying the signal to generate a magnitude signal. Magnitude generator 300 receives the $\rho$ (or $\rho V$) signal and provides a magnitude signal to adder 304. Adder 304 sums the magnitude value with the contents of sum register 302 and places the resulting sum in register 302. Period timer and counter 226 effectively counts periods in the $\rho$ (or $\rho V$) signal based upon the signal from Schmitt trigger 224 and issues an interrupt at the end of the "Averaging Period" shown in FIG. 6 that latches the value in sum register 302 into latch 308 and the value of the period timer and counter 226 (the length of the "Averaging Period") into latch 310. The "Averaging Period" is the time required for Schmitt trigger 224 to output an integer number of cycles and is set to be no less than the update rate of microprocessor 232 (approximately 0.1 seconds). The update rate of microprocessor 232 is the rate at which microprocessor 232 updates the mass flow calculation. The interrupt also resets sum register 302 to zero for the next summation. This interrupt also signals microprocessor 232 to retrieve values in latch 308 and latch 310. The timing of all these operations is synchronized by system clock 209. At the interrupt, latch 308 contains a value representative of the numerator of Equation 5, $$\sum_{N=1}^{N=J} |Y(N)|.$$

Microprocessor 232 determines J of Equation 5 by dividing the length of the "Averaging Period" stored in latch 310 by the digital sampling frequency of decimating filter 208.

Microprocessor 232 calculates mass flow, M, and, as appropriate density, $\rho$, from the $\rho$ or $\rho V$ signals according to Equations 3-5 by replacing the $V_0$ term with the amplitude of the $\rho$ and $\rho V$ signals and including a correction factor due to the transfer function of each filter 208 through 222, described below.

The frequency response transfer functions of the individual filters in the above implementation are described with equations. The transfer functions for FIR decimating filter 208 is:

$$H_F = \frac{\sin^3(\pi R)}{\left(1000 \sin^3\left(\frac{\pi R}{10}\right)\right)} \qquad \text{Equation 6}$$

The transfer function for bilinear filter 210 is:

$$H_B = \frac{1}{[1 + 9 \tan^2 R)]^{\frac{1}{2}}}. \qquad \text{Equation 7}$$

The respective transfer functions for each low pass filter 220 and 222 are:

$$H_{LP} = \frac{1}{[1 + 2B(B - 1)(1 - \cos(2\pi R))]^{\frac{1}{2}}}. \qquad \text{Equation 8}$$

The transfer function for high pass filters 212 through 218 is:

$$H_{HP} = \frac{(A - 1)[2(1 - \cos(2\pi R))]^{\frac{1}{2}}}{[1 + 2A(A - 1)(1 - \cos(2\pi R))]^{\frac{1}{2}}}. \qquad \text{Equation 9}$$

Microprocessor 232 provides an M and, as appropriate, $\rho$ output as shown in FIG. 7. This output may be transmitted over 4–20 mA current loop with converter 237. In Equations 6–9, $R = F/F_s$ where F is the vortex frequency and $F_s$ is the digital sampling frequency of decimating filter 208. A and B are the low pass and high pass filter coefficients, respectively. In one embodiment, A and B are multiples of 2 to simplify the multiplications and divisions in the time domain digital equation.

As vortex sensor signal $V_0$ passes through filters 208–222, its amplitude is modified by multiplying the signal by the respective filter's transfer function. The average value of the signal at the $\rho V$ output can be expressed as the following:

$$V_{\rho V} = V_0 H_F H_B H_{HP212} H_{LP220} H_{HP214} = V_0 H_{N\rho V} \qquad (10)$$

and at the $\rho$ output:

$$V_\rho = V_0 H_F H_B H_{HP212} H_{LP222} H_{HP214} H_{LP222} H_{HP216} H_{HP218} = V_0 H_{N\rho} \qquad (11)$$

where the subscript numbers represent the particular filter's transfer function and $H_{N\rho V}$ and $H_{N\rho}$ represent the product of all the filters up to the $\rho V$ and $\rho$ outputs, respectively. Solving Equation 10 for $V_0$ and substituting $V_0$ into Equation 3 yields the following equations for density and mass flow where the PV signal is input to the circuitry of FIG. 7:

$$M = V_{\rho V}/[K_M F H_{N\rho V}] \text{ and } \rho = V_{\rho V}/[K_N F^2 H_{N\rho V}] \qquad (12)$$

and another set of M and $\rho$ equations when the $\rho$ signal is used:

$$M = V_\rho/[K_M F H_{N\rho}] \text{ and } \rho = V_\rho/[K_N F^2 H_{N\rho}] \qquad (13)$$

where M is the mass flow.

These equations show that mass flow and density are derived from either the $\rho$ or $\rho V$ signals. However, the $\rho$ signal is preferred because the filters have removed more noise from the signal. Further, the size of sum register 302 can be smaller. Note that $K_M/K_N = K_L$ where $F = K_L V$, therefore mass flow can be expressed as a product of density and the volumetric flow, as expected.

With the above equations, microprocessor 232 calculates mass flow based upon the average signal ($\rho$ or $\rho V$) generated with the circuitry of FIG. 7. The various computational circuits can be implemented through any appropriate means, including the microprocessor. Small frequency response errors in amplifier 201 and anti-aliasing filter 202 can also be included in the calculation of density or mass flow by calibrating these effects into the above equations.

Although the present invention has been described with reference to preferred embodiments, workers skilled in the art will recognize that changes may be made in form and detail without departing from the spirit and scope of the invention.

What is claimed is:

1. A transmitter sensing a differential pressure of a flowing fluid and transmitting an output representative of a mass of the flow, comprising;

filter circuitry for filtering a noise contaminated signal having a fundamental frequency varying responsively to the mass of the flow, the filter circuitry filtering the noise with an LP filter and a current HP filter characteristic to produce a filtered signal having a frequency and an amplitude related to mass flow, the HP filter characteristic selected from a family of preselectable HP filters, each HP filter having varying corner frequencies and a switchup and a switchdown value corresponding thereto;

timer circuitry providing a period timer value representative of the time between period boundaries of the filtered signal and for providing a present timer value representative of the elapsed time since a last period boundary of the filtered signal;

response circuitry selecting a current HP filter for use in the filter circuitry, such that an HP filter corner higher in frequency than the current filter corner is selected when the period timer value is less than a switchup value corresponding to the filter having such next higher corner frequency and an HP filter corner lower in frequency than the current filter corner is selected when the present timer value exceeds a switchdown value corresponding to such lower filter characteristic; and output circuitry for calculating mass flow based upon frequency and average amplitude of the filtered signal and providing a mass flow output.

2. The transmitter of claim 1 wherein the output circuitry includes:

summation circuitry which sums magnitudes of digital values of the filtered signal over a summation period in synchronization with boundaries of periods of the filtered signal; and wherein the mass flow circuitry calculates average amplitude of the filtered signal based upon summed magnitudes and number of digital values.

3. The transmitter of claim 1 wherein the filter circuitry has a transfer function and the output circuitry corrects for changes in the filtered signal based upon the filter transfer function.

4. The transmitter of claim 1 including an LP filter which filters the noise contaminated signal, and wherein the average amplitude of the filtered signal is proportional to fluid density times fluid velocity.

5. The transmitter of claim 4 including a second LP filter connected in series with the LP filter, and wherein the average amplitude of the filtered signal is proportional to fluid density.

6. A transmitter sensing a differential pressure of a vortex in a flowing fluid and transmitting an output representative of a mass of the flow, comprising:

an LP filter for filtering a noise contaminated differential pressure signal having a fundamental frequency varying responsively to mass of the flow, the filter filtering noise with a current LP filter characteristic to produce a filtered signal having a frequency related to mass flow of the fluid, the LP filter characteristic selected from a family of preselected LP filters, each filter having a low frequency LP corner frequency;

a Schmitt trigger receiving the filtered signal and providing a stable filtered signal output;

circuitry for selecting an LP filter characteristic from the family of LP filter characteristics of the LP filter wherein the LP filter decreases the corner frequency until a first frequency is reached where the stable filtered output signal is no longer a square wave, and then increases the corner frequency to a second frequency greater than the first frequency; and mass flow calculation circuitry receiving the filtered signal and calculating mass flow based upon frequency and average amplitude of the filtered signal and providing an output related to the mass of the flow.

7. The transmitter of claim 6 including a second LP filter in series with the LP filter, wherein the average amplitude of the filtered signal is proportional to fluid density.

8. The transmitter of claim 6 wherein the average amplitude of the filtered signal is proportional to fluid density times fluid velocity.

9. The transmitter of claim 9 wherein the mass flow calculation circuitry includes:

summation circuitry which sums magnitudes of digital values of the filtered signal over a summation period which has a duration of an integer number of periods of the filtered signal; and wherein the mass flow circuitry calculates average magnitude of the filtered signal based upon summed magnitudes and number of digital values.

10. The transmitter of claim 6 wherein the filter circuitry has a transfer function and the mass flow calculation circuitry corrects the filtered signal based upon the transfer function.

11. The transmitter of claim 6 including an HP filter which filters the noise contaminated signal.

12. A transmitter sensing a differential pressure of a vortex in a flowing fluid and transmitting an output related to mass flow, comprising:

a dynamic filter filtering a vortex differential pressure signal having a controllable transfer function and providing a filtered signal related to fluid density;

control circuitry controlling the controllable transfer function of the dynamic filter, calculating the average amplitude of the filtered signal and correcting for errors in the filtered signal based upon the controllable transfer function; and transmitter circuitry transmitting a signal related to mass flow based upon a corrected filter output.

13. The transmitter of claim 12 Wherein the control circuitry includes:

summation circuitry which sums magnitudes of digital values of the filtered signal over a summation period which has a duration of an integer number of periods of the filtered signal; and wherein the control circuitry calculates average magnitude of the filtered signal based upon summed magnitudes and number of digital values.

14. The transmitter of claim 12 including an HP filter which filters the differential pressure signal.

* * * * *

UNITED STATES PATENT AND TRADEMARK OFFICE
CERTIFICATE OF CORRECTION

PATENT NO. : 5,429,001
DATED      : July 4, 1995
INVENTOR(S) : Lowell Kleven

It is certified that error appears in the above-indentified patent and that said Letters Patent is hereby corrected as shown below:

Col. 14, line 47, at the end of the line please insert --]--.

Signed and Sealed this

Thirteenth Day of February, 1996

Attest:

BRUCE LEHMAN

*Attesting Officer*    *Commissioner of Patents and Trademarks*